Figure 1:
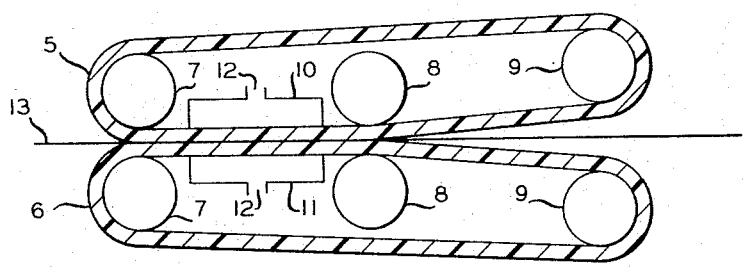

Jan. 3, 1967    OLE-BENDT RASMUSSEN    3,296,351
METHOD OF PRODUCING A LATERAL STRETCHING OF
A CONTINUOUS SHEET MATERIAL
Original Filed Aug. 8, 1962

INVENTOR
OLE-BENDT RASMUSSEN
BY
ATTORNEYS

United States Patent Office 3,296,351
Patented Jan. 3, 1967

3,296,351
METHOD OF PRODUCING A LATERAL STRETCH-ING OF A CONTINUOUS SHEET MATERIAL
Ole-Bendt Rasmussen, Copenhagen, Denmark, assignor to Phillips Petroleum Company, a corporation of Delaware
Original application Aug. 8, 1962, Ser. No. 215,745, now Patent No. 3,235,644, dated Feb. 15, 1966. Divided and this application Nov. 29, 1965, Ser. No. 510,194
5 Claims. (Cl. 264—289)

This is a division of application Serial No. 215,745, filed August 8, 1962, now Patent Number 3,235,644.

The present invention relates to a method of producing a lateral stretching of a continuous sheet material. The method is in particular suitable for producing a sheet material intended for use as a shrinking foil and in laminates, but besides it is very well suited for pre-treating a sheet material which has been strongly oriented by stretching in longitudinal direction for the purpose of producing so-called split fibers, and which is consequently easily fissionable in said direction.

It is known per se to stretch sheet material laterally, but the known methods have various drawbacks. Thus it has been proposed to stretch continuous films laterally by means of series of travelling claws which are successively gripping the edges of the foil and during their forward movement move ever more apart from each other. This carries the inconvenience that the foil edges become uneven, the stretching being more pronounced at the spots where the claws are pulling, and on the one hand the edges will therefore have to be trimmed afterwards, and on the other hand, the sheet material becomes uneven or corrugated on account of the varying pulling action.

A method which has gained a stronger foothold in practice is to produce the continuous film from a tube which is subjected to inner pressure after extrusion and is thereby enlarged to a greater diameter, after which the tube thus enlarged is cut up longitudinally and spread out to form a plane film. It is obvious that this demands a very uniform wall thickness of the tube originally extruded, as otherwise the stretching will take place mainly at the spots where the thickness is smallest, this resulting in an uneven film.

The said disadvantages can partly be obviated by effecting the stretching in the neighbourhood of the melting point range of the material, but this is undesirable, among others, if the stretched film is to be used as a shrinking foil, the shrinking demanding that the material be heated to a temperature above that at which it has been stretched. The lower the temperature prevailing during stretching of the material, the greater range of temperature is at disposal for shrinking purposes, and the lesser are the demands for an exact observance of temperature conditions.

In the production of split fibers, a strongly oriented sheet material is submitted to a mechanical action whereby splitting takes place in the orientation direction, but the splitting takes place rather casually, and is difficult to control so as to obtain a uniform fiber material.

In the present method, the said inconveniences are avoided, and an essentially better result is achieved than possible by the hitherto known methods, the stretching according to the invention being effected by confining the sheet material between two endless bands of an elastic material which are carried along keeping time with the conveyance of the sheet material under successive distension transversely to the conveying direction.

If in that process an unstretched orientable sheet material is used, as for example nylon or polyethylene, it will mainly become oriented transversely, and by lamination with a material oriented in longitudinal direction a laminate is obtained which in all respects possesses a high strength against further rupture, i.e. resistance against continued rupture of a fissure once formed, which is, therefore, suitable for many purposes, for instance for packing purposes.

One can also start with a sheet material which is weakly oriented in the longitudinal direction and thus acquire a biaxially oriented film. This is particularly important in the production of thin, strong films. The films might indeed be obtained by stretching only in one direction, but this would cause the material to become highly fissionable in the stretching direction and thus be completely inadequate at least for packing purposes.

Finally, starting with a sheet material which has been strongly oriented by stretching longitudinally and accordingly being easily fissionable, the uniform effect arising from the film being confined over its entire breadth and consequently being uniformly stretched will cause the formation of a tight and homogeneous system of microscopic fissures and cleavages, securing highly uniform fiber dimensions in a subsequent mechanical cleaving process.

It is convenient, according to the invention, that endless bands of elastic material be used which are carried over rollers, the mutual distance of which has been so adjusted that the bands undergo a contraction in longitudinal direction simultaneous with the distension in the crosswise direction. An action in the longitudinal direction concurrent with the transverse action on the sheet material caused by the distension is thereby avoided or reduced so that the progress of the orientation becomes more uniform.

Using endless bands of rubber with crosswise incorporated, diagonal threads according to the invention makes it possible to have the contraction in longitudinal direction take place uniformly over the entire part of the band which is being distended, and by varying the angle between the incorporated threads, the grade of contraction can be controlled so as to get the most adequate value in respect of the material and of the purpose of the treatment.

In order that the pulling action be exerted everywhere in the sheet material under treatment, according to the invention compressed air is used to press the endless bands against each other and against the interposed sheet material during the distension.

Figure 2:
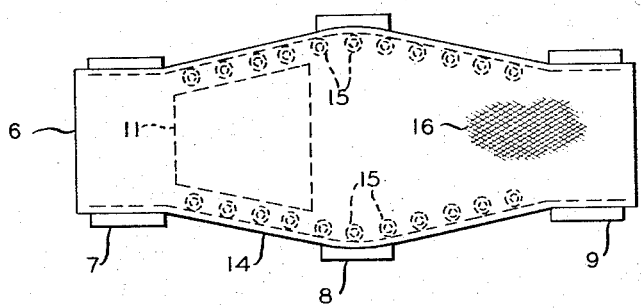

In the drawing, an embodiment of the arrangement of endless bands for use in the present method is shown, FIG. 1 showing a longitudinal section, and
FIG. 2 the lower band, seen from above.

Two endless rubber bands 5 and 6 are carried over rollers 7, 8 and 9 in such manner that the bands are pressed against one another between the rollers 7 and 8, but move a little away from one another between the rollers 8 and 9. For the purpose of increasing the pressure of the bands against one another, compressed-air boxes 10 and 11 are mounted between the rollers 7 and 8, said boxes being open against the reverse of the bands, and compressed air being supplied through inlets 12. A film to be submitted to a stretching action is denoted 13.

The stretching is effected by distending the rubber bands on the section between roller 7 and roller 8. As suggested, the stretching may be effected by providing the edges of the bands 5 and 6 with a bead 14 which is terminated inwards by a surface at a substantially right angle to the band surface, and which is acted upon by two series of wheels 15 fastened to rails not shown, the said wheels forcing the two band edges apart on the section between the rollers 7 and 8, thereby crosswise stretching the film 13 which is here confined between the bands 5 and 6. In the section between the rollers 8 and 9, the rubber bands are again allowed to contract, but they have then released the film so that the latter does not take part in the contraction.

The movement of the rubber bands is effected by one or more of the rollers 7, 8 and 9 being driven, and there may be incorporated diagonally running threads 16 in the bands, for example at an angle of about 30° with the longitudinal direction of the bands, the said threads serving to make the bands undergo a contraction in the longitudinal direction equalling the distension in the transverse direction.

I claim:

1. A method of making fiber from orientable plastic film which comprises strongly orienting a sheet of thermoplastic material sufficiently to make the said sheet easily fissionable by stretching the sheet longitudinally in a known manner and subsequently laterally stretching the longitudinally oriented sheet by sandwiching the sheet between two elastomeric bands, and gradually distending said bands laterally while allowing said bands to contract longitudinally.

2. In a method of producing split fibers having a tight and homogeneous system of microscopic fissures and cleavages from an orientable plastic film which comprises orienting said plastic film sufficiently to make said film easily fissionable by stretching same longitudinally, passing said film in a direction parallel to its longitudinal orientation in confinement over substantially its entire breadth between sections of two endless rubber bands being pressed together, said rubber bands being passed over rollers, the mutual distance of which is so adjusted as to allow for a contraction of the rubber bands in a longitudinal direction, and gradually distending said rubber bands laterally together with the confined film from the place of entry of the latter to the place where it leaves the confinement between the rubber bands.

3. In a method according to claim 2, the step which comprises pressing the endless rubber bands against each other and the interposed film by means of compressed air.

4. Apparatus for laterally stretching plastic sheet material without longitudinal stresses comprising two endless elastomeric belts mounted on rollers adjacent and laterally parallel to each other so that a portion of the outer surfaces of said belts come together, said belts having beaded edges, diverging bearing means contacting said beaded edges over the length of said belts coming together forcing said belts to stretch laterally, a plurality of diagonally disposed threads imbedded crosswise in said belts to force longitudinal contraction thereof when stretched laterally, and means to press said belts together to grip film stock placed therebetween.

5. The apparatus of claim 4 wherein said means to press said belts together include two compressed-gas chambers, one on each side of said belt portions open against the reverse side of said belt portions.

No references cited.

ALEXANDER H. BRODMERKEL, *Primary Examiner.*

F. S. WHISENHUNT, *Assistant Examiner.*